United States Patent
Lee

(10) Patent No.: US 10,226,890 B2
(45) Date of Patent: Mar. 12, 2019

(54) MOLDING APPARATUS

(71) Applicant: HYUNDAI MOTOR COMPANY, Seoul (KR)

(72) Inventor: Dong Hyun Lee, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 313 days.

(21) Appl. No.: 15/174,579

(22) Filed: Jun. 6, 2016

(65) Prior Publication Data

US 2016/0354965 A1 Dec. 8, 2016

(30) Foreign Application Priority Data

Jun. 8, 2015 (KR) ........................ 10-2015-0080580

(51) Int. Cl.
*B29C 47/12* (2006.01)
*B29C 47/08* (2006.01)
*B29C 47/00* (2006.01)
*B29L 31/30* (2006.01)
*B29L 31/26* (2006.01)
*B29K 21/00* (2006.01)

(52) U.S. Cl.
CPC ...... *B29C 47/0059* (2013.01); *B29C 47/0052* (2013.01); *B29C 47/003* (2013.01); *B29K 2021/00* (2013.01); *B29L 2031/265* (2013.01); *B29L 2031/30* (2013.01)

(58) Field of Classification Search
CPC ............ B29C 47/0059; B29C 47/0052; B29C 47/003; B29K 2021/00; B29L 2031/265; B29L 2031/30
See application file for complete search history.

(56) References Cited

U.S. PATENT DOCUMENTS

| | | | | |
|---|---|---|---|---|
| 4,419,014 A * | 12/1983 | Gale | .................... | B01F 7/00816 366/279 |
| 6,013,222 A * | 1/2000 | Douglas | ............... | B24D 11/001 264/171.1 |
| 6,203,740 B1 * | 3/2001 | Kirjavainen | ............ | B29C 44/22 264/167 |
| 6,604,922 B1 * | 8/2003 | Hache | ................... | B29C 70/086 418/153 |
| 7,192,260 B2 * | 3/2007 | Lievestro | ................. | B23H 3/00 205/651 |
| 7,316,501 B2 * | 1/2008 | Thoma | ................ | B01F 3/04531 366/168.1 |
| 7,950,914 B2 * | 5/2011 | Hooper | ................. | F04C 2/1075 418/152 |
| 8,337,182 B2 * | 12/2012 | Lee | ........................ | F04C 2/1075 418/1 |

(Continued)

FOREIGN PATENT DOCUMENTS

| JP | H05-8280 A | 1/1993 |
|---|---|---|
| JP | H09-39067 A | 2/1997 |

(Continued)

*Primary Examiner* — Nahida Sultana

(74) *Attorney, Agent, or Firm* — Morgan Lewis & Bockius LLP

(57) ABSTRACT

A molding apparatus includes an extrusion die having an extruding orifice and a projection forming orifice, and a rotor rotatably installed in a middle portion of the extrusion die and having a forming recess adjacent to the projection forming orifice.

13 Claims, 8 Drawing Sheets

(56) References Cited

U.S. PATENT DOCUMENTS

| | | | | |
|---|---|---|---|---|
| 8,658,074 B2* | 2/2014 | Downton | ............ | B29C 47/0023 264/176.1 |
| 8,734,141 B2* | 5/2014 | Slay | ...................... | F04C 2/1075 418/48 |
| 8,888,474 B2* | 11/2014 | Hohl | ......................... | E21B 4/02 418/48 |
| 8,926,165 B2* | 1/2015 | Ohtsuka | .................... | A01J 11/10 366/130 |
| 8,944,789 B2* | 2/2015 | Butuc | ................... | F04C 2/1075 418/1 |
| 9,163,629 B2* | 10/2015 | Lee | ....................... | F04C 2/1075 |
| 9,228,584 B2* | 1/2016 | Akbari | .................. | F04C 2/1075 |
| 9,416,780 B2* | 8/2016 | Steele | ...................... | C25D 1/02 |
| 9,539,551 B2* | 1/2017 | Brown | ................ | B01F 7/00775 |
| 9,896,885 B2* | 2/2018 | Blake | ......................... | E21B 4/02 |
| 2003/0039712 A1* | 2/2003 | Friedrich | .............. | B29C 47/365 425/204 |
| 2003/0128624 A1* | 7/2003 | Inoue | ...................... | B29B 7/482 366/83 |
| 2016/0128362 A1* | 5/2016 | Morales-Alvarez | ...... | A23L 7/17 426/622 |
| 2017/0223992 A1* | 8/2017 | Morales-Alvarez | .... | A23L 7/117 |

FOREIGN PATENT DOCUMENTS

| | | |
|---|---|---|
| JP | 3841436 B2 | 11/2006 |
| KR | 10-1386281 B1 | 4/2014 |

* cited by examiner

MOLDING APPARATUS

CROSS-REFERENCE TO RELATED APPLICATION

This application claims the benefit of priority to Korean Patent Application No. 10-2015-0080580, filed on Jun. 8, 2015 with the Korean Intellectual Property Office, the disclosure of which is incorporated herein in its entirety by reference.

TECHNICAL FIELD

The present disclosure relates to a molding apparatus and, more particularly, to a molding apparatus capable of simply and precisely forming an extrusion product having a shape in which one or more projections are integrally formed in a body part by adopting a structure enabling extrusion forming and projection forming to be simultaneously performed.

BACKGROUND

Extrusion is a mold process used to create objects of a fixed cross-sectional profile in a length direction. Through extrusion, an extrusion product having a desired cross-sectional profile may be obtained by an extruder having an extruding aperture with a desired shape. Such products of extrusion are widely used in various fields such as automobiles and manufacturing.

FIG. 1 illustrates a configuration of a weather strip for a vehicle. The weather strip for a vehicle illustrated in FIG. 1 has a structure in which one or more projections 2 are integrally provided on one side of a body part 1, and the body part 1 has an extruded shape with a fixed cross-sectional profile in a length direction.

In order to mold the product illustrated in FIG. 1, in the related art, after the body part 1 is extruded through an extrusion process, one or more projections 2 are molded with respect to the extruded body part 1 through insert-injection molding, thus integrating the one or more projections 2 with the body part 1.

Thus, in the related art manufacturing method, two stages of the extrusion process and the insert-injection process are performed, making the manufacturing process cumbersome and lengthening a manufacturing time and increasing manufacturing costs.

SUMMARY

The present disclosure has been made to solve the above-mentioned problems occurring in the prior art while advantages achieved by the prior art are maintained intact.

An aspect of the present disclosure provides an extrusion molding apparatus configured to rotate one or more rotors having a forming recess for forming a projection in a middle portion of an extrusion die to thereby perform extrusion forming and projection forming through a single process, whereby a product having an extrusion shape with one or more projections integrally formed thereon is quickly and precisely formed.

According to an exemplary embodiment of the present disclosure, a molding apparatus may include: an extrusion die having an extruding orifice and a projection forming orifice; and a rotor rotatably installed in a middle portion of the extrusion die and having a forming recess adjacent to the projection forming orifice.

The extruding orifice may form an extrusion shape, and the projection forming orifice may form a projection shape in cooperation with the forming recess.

The extruding orifice may include a first extruding orifice disposed at an upstream side of the forming recess and a second extruding orifice disposed at a downstream side of the forming recess, and the projection forming orifice may include a first projection forming orifice disposed at the upstream side of the forming recess and a second projection forming recess disposed at the downstream side of the forming recess.

The first extruding orifice and the second extruding orifice may have the same shape and the same size.

The first projection forming orifice may have a cross-sectional area larger than that of the second projection forming orifice.

The extrusion die may include a first extrusion die positioned in a direction in which a material is introduced and a second extrusion die positioned in a direction in which the material is discharged.

The first extruding orifice and the first projection forming orifice may be formed in the first extrusion die, and the second extruding orifice and the second projection forming orifice may be formed in the second extrusion die.

The rotor may be rotatably installed between the first extrusion die and the second extrusion die.

An accommodation surface rotatably accommodating the rotor may be provided in portions of the first extrusion die and the second extrusion die facing each other.

The accommodation surface may be provided to correspond to an outer surface of the rotor.

According to another exemplary embodiment of the present disclosure, a molding apparatus for forming an extrusion product having an extrusion shape and including one or more projections integrally formed thereon, may include: an extrusion die having an extruding orifice for forming the extrusion shape and a projection forming orifice for forming a projection shape; and a rotor rotatably installed in a middle portion of the extrusion die and having a forming recess for forming the projection shape in cooperation with the projection forming orifice.

The extrusion die may include a first extrusion die positioned in a direction in which a material is introduced and a second extrusion die positioned in a direction in which the material is discharged.

The first extrusion die may have a first extruding orifice and a first projection forming orifice, the second extrusion die may have a second extruding orifice and a second projection forming orifice, the first extruding orifice and the second extruding orifice may communicate with each other, and the first projection forming orifice and the second projection forming orifice may communicate with each other.

The rotor may be rotatably installed between the first extrusion die and the second extrusion die.

An accommodation surface rotatably accommodating the rotor may be provided in portions of the first extrusion die and the second extrusion die facing each other.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
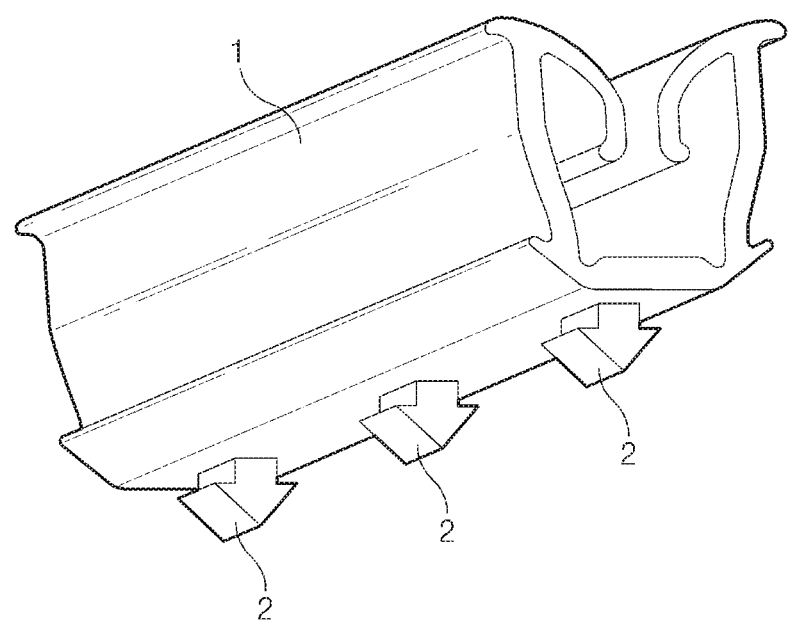
FIG. 1 is a perspective view illustrating a configuration of a weather strip for a vehicle.
Figure 2:
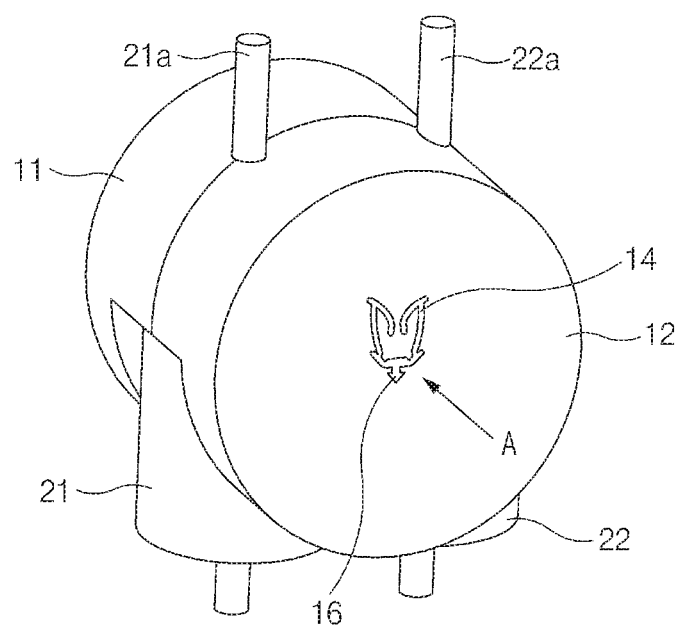
FIG. 2 is a perspective view illustrating a molding apparatus according to an exemplary embodiment of the present disclosure.

Hereinafter, exemplary embodiment of the present disclosure will be described in detail with reference to the accompanying drawings. For reference, dimensions of elements or thicknesses of lines illustrated in the drawings referred to describe the present disclosure may be exaggerated to aid understanding. Also, the terms used henceforth have been defined in consideration of the functions of the present disclosure, and may be altered according to the intent of a user or operator, or conventional practice. Therefore, the terms should be defined on the basis of the entire content of this specification.

As illustrated in FIGS. 2 through 7, a molding apparatus according to an exemplary embodiment of the present disclosure may include extrusion dies 11 and 12 respectively having extruding orifices 13 and 14 and a pair of rotors 21 and 22 rotatably installed in the middle of the extrusion dies 11 and 12.

As illustrated in FIGS. 2 through 7, the extrusion dies 11 and 12 may include a first extrusion die 11 positioned in a direction in which a material is introduced and a second extrusion die 12 positioned in a direction in which a material is discharged.

The first extrusion die 11 may have a first extruding orifice 13 and a first projection forming orifice 15.

The second extrusion die 12 may have a second extruding orifice 14 and a second projection forming orifice 16.

Figure 3:
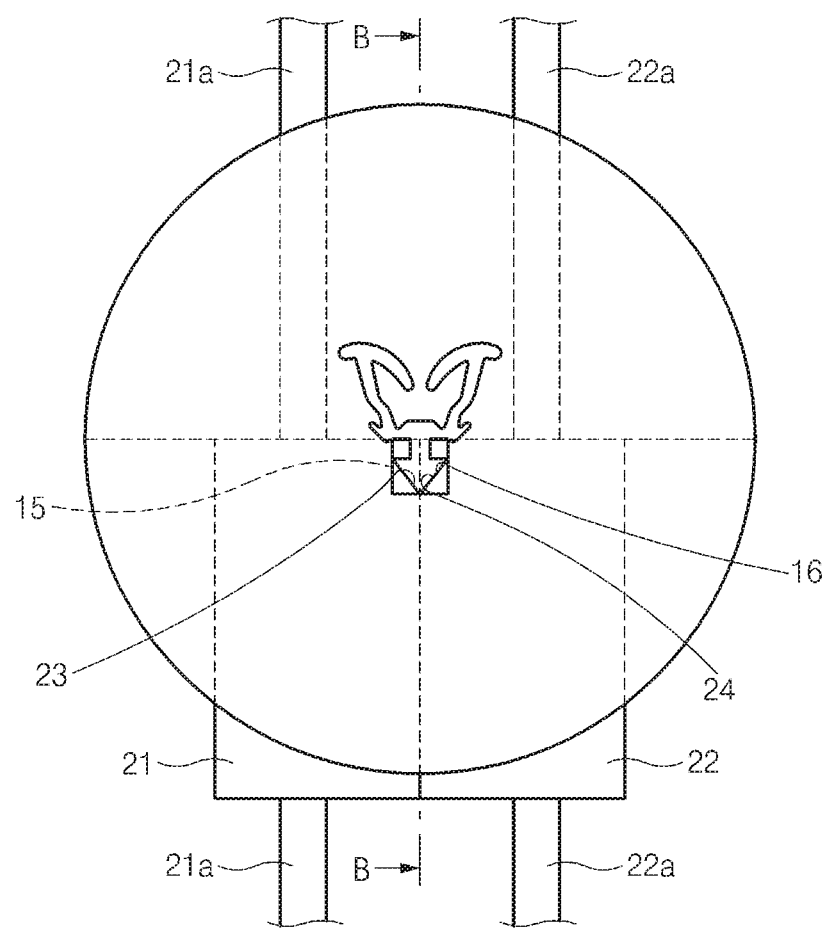
FIG. 3 is a view taken along a direction indicated by the arrow "A" of FIG. 2.
Figure 4:
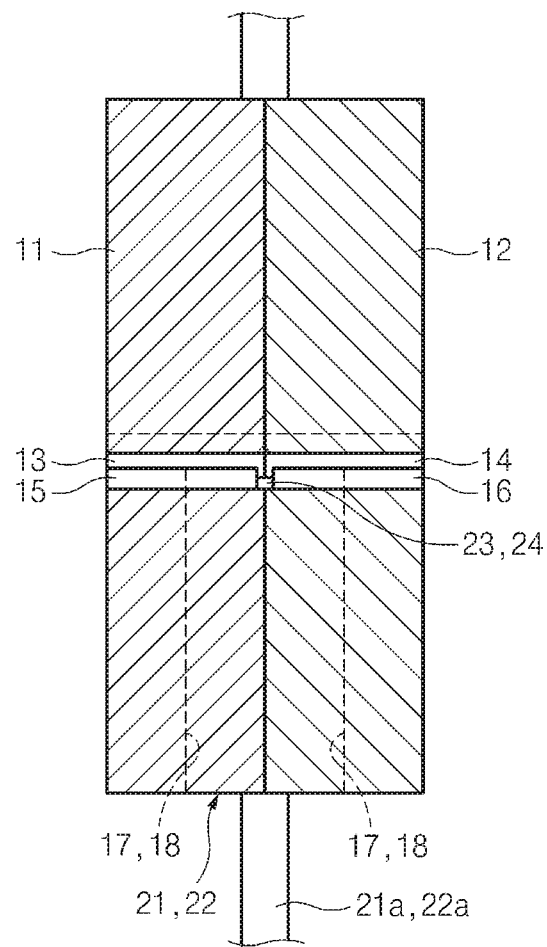
FIG. 4 is a cross-sectional view taken along line B-B of FIG. 3.
Figure 8:
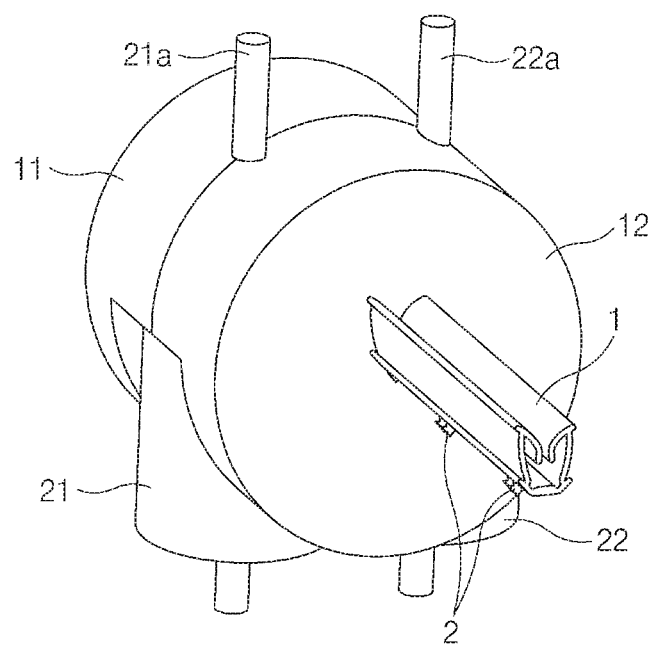
FIG. 8 is a view illustrating a process of forming a product through a molding apparatus according to an exemplary embodiment of the present disclosure.

As illustrated in FIG. 3, the first extruding orifice 13 of the first extrusion die 11 and the second extruding orifice 14 of the second extrusion die 12 may have the same shape and same size. Thus, as illustrated in FIG. 4, when the first extrusion die 11 and the second extrusion die 12 are assembled, the first extruding orifice 13 and the second extruding orifice 14 may communicate with each other, and accordingly, a material, while passing through the first extruding orifice 13 and the second extruding orifice 14, may be extruded to form a body part 1 having a fixed cross-sectional profile in a length direction as illustrated in FIG. 8. For example, the first extruding orifice 13 of the first extrusion die 11 and the second extruding orifice 14 of the second extrusion die 12 may be extruding paths for forming an extruding shape having the same extruding cross-sectional profile as that of the body part 1 of FIG. 1.

Also, as the first extrusion die 11 and the second extrusion die 12 may be assembled as illustrated in FIG. 4, the first projection forming orifice 15 of the first extrusion die 11 and the second projection forming orifice 16 of the second extrusion die 12 may communicate with each other. The first projection forming orifice 15 and the second projection forming orifice 16 may cooperate with forming recesses 23 and 24 of the rotors 21 and 22 as described hereinafter to integrally form one or more projections 2 on a lower portion of the body part 1 as illustrated in FIG. 8. That is, the first projection forming orifice 15 and the second projection forming orifice 16 may be projection forming paths for forming a projection shape such as the projection 2 of FIG. 1.

The pair of rotors 21 and 22 may be rotatably installed in mutually opposite directions between the first extrusion die 11 and the second extrusion die 12, and the forming recesses 23 and 24 for forming the projections 2 of FIG. 1 may be provided in the rotors 21 and 22, respectively.

The first extrusion die 11 and the second extrusion die 12 each may have accommodation surfaces 17 and 18 rotatably accommodating the rotors 21 and 22 in portions thereof facing each other.

As illustrated in FIG. 4, a pair of accommodation surfaces 17 and 18 corresponding to the pair of rotors 21 and 22 may be formed to be symmetrical bilaterally on one side of the first extrusion die 11, and the accommodation surfaces 17 and 18 may be provided to be curved to correspond to outer circumferential surfaces of the rotors 21 and 22, respectively.

Figure 5:
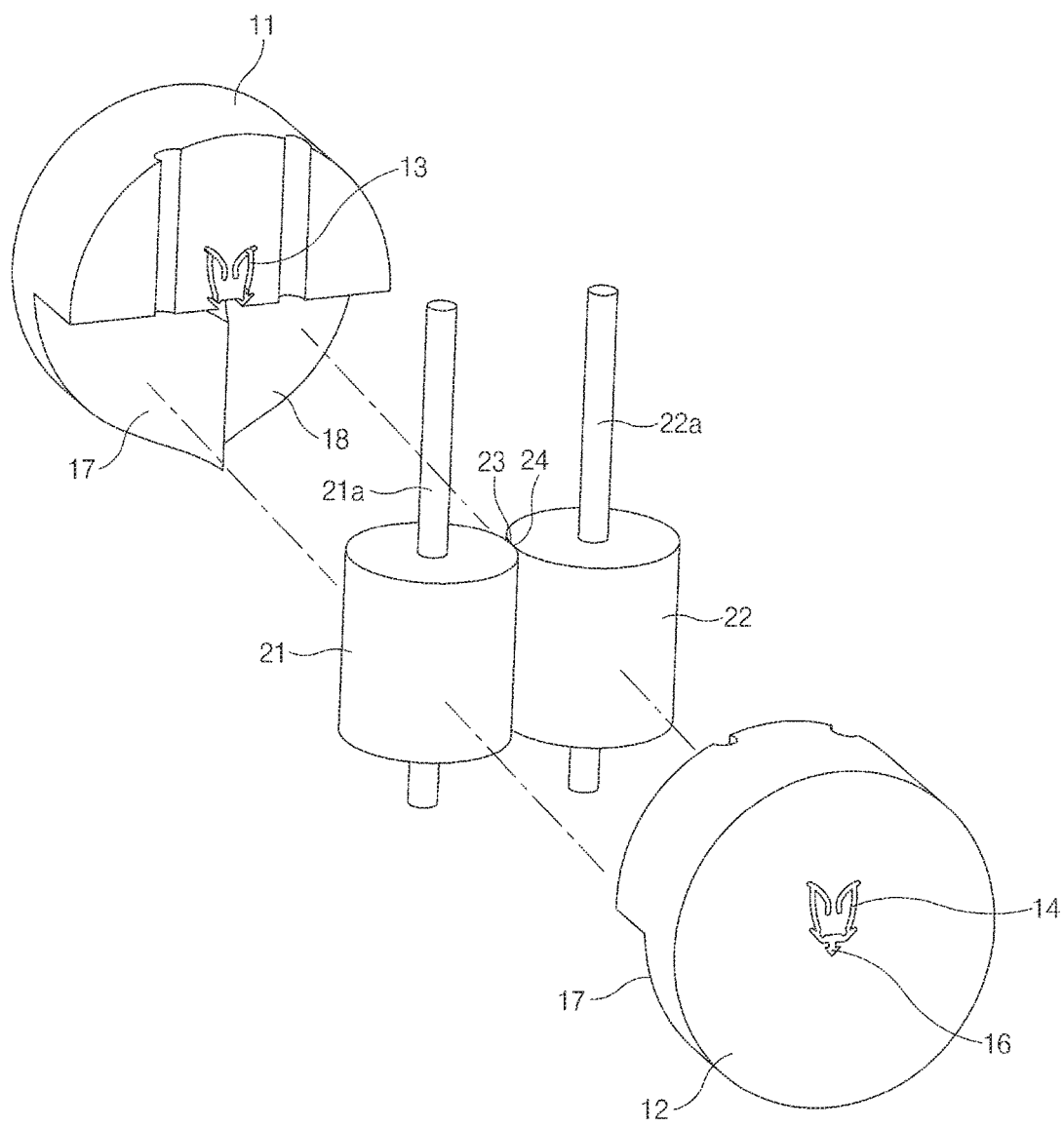
FIG. 5 is an exploded perspective view illustrating a state in which first and second extrusion dies and a rotor are separated in a molding apparatus according to an exemplary embodiment of the present disclosure.
Figure 6:
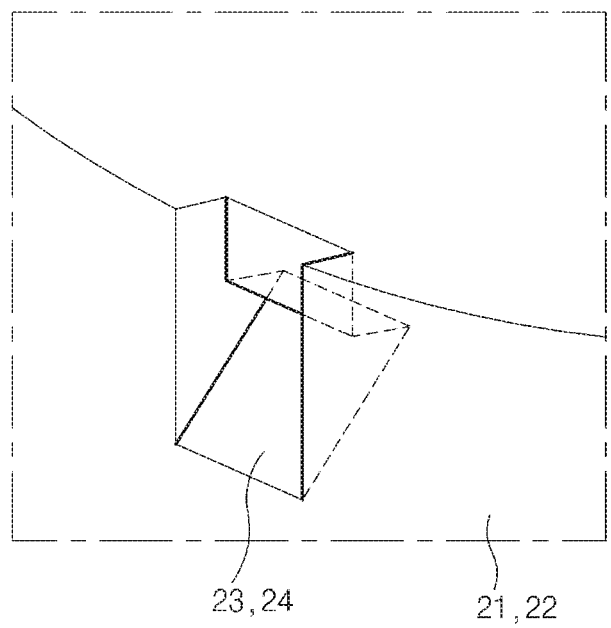
FIG. 6 is an enlarged view of a forming recess of the rotor of FIG. 5.

Although not shown in FIG. 5, a pair of accommodation surfaces 17 and 18 may also be provided to be curved to correspond to the outer circumferential surfaces of the rotors 21 and 22 on one side of the second extrusion die 12.

Figure 7:
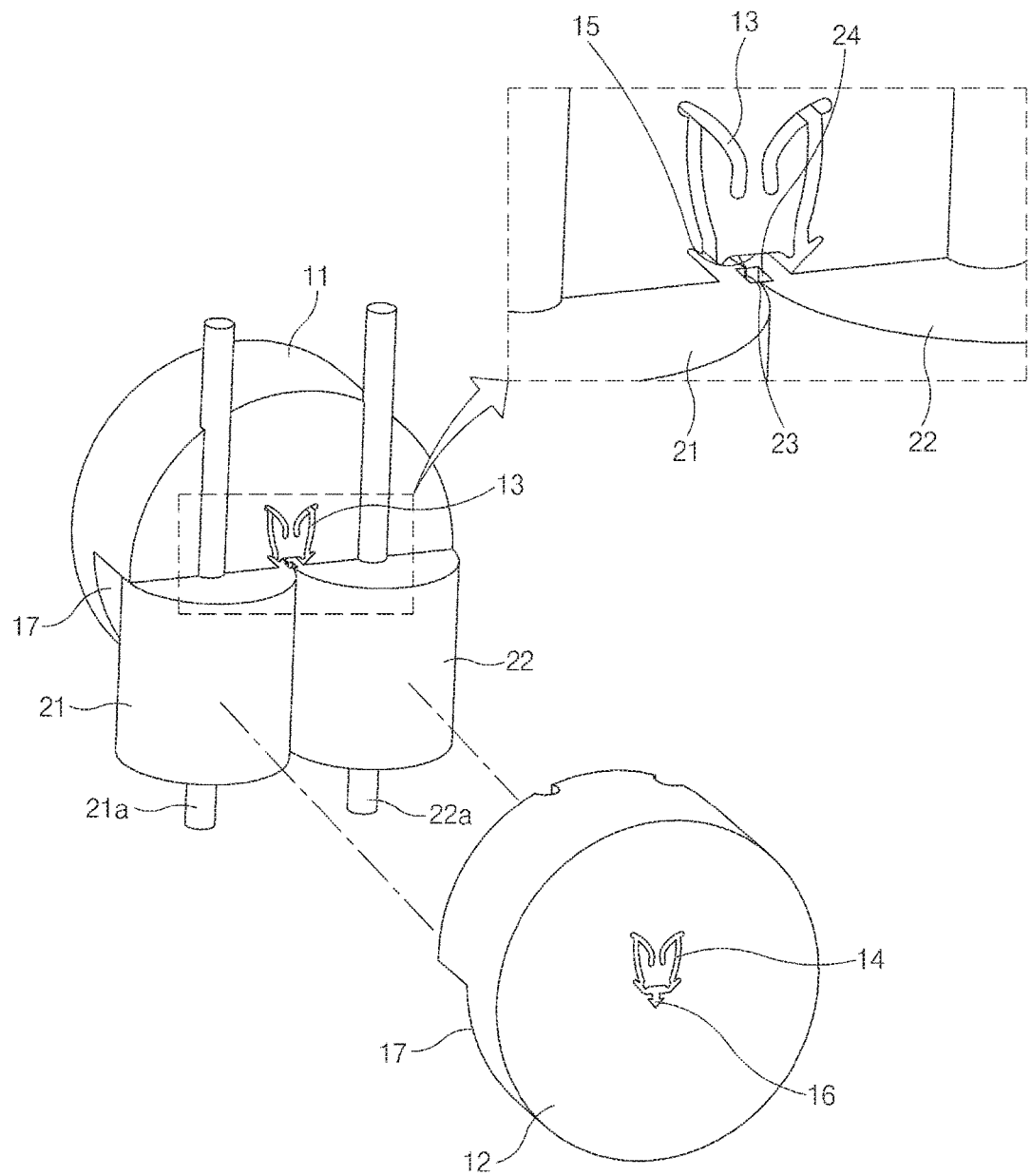
FIG. 7 is a view illustrating a state in which a pair of rotors is assembled to a first extrusion die and a second extrusion die is separated from the first extrusion die.

As illustrated in FIGS. 3, 5 and 7, the forming recesses 23 and 24 may be provided on upper edges of the rotors 21 and 22, respectively. As the pair of rotors 21 and 22 rotate in a facing manner such the pair of forming recesses 23 and 24 face each other, the shape corresponding to the projections 2 of FIG. 1 may be formed. As illustrated in FIG. 3, the pair of forming recesses 23 and 24 may have a mutually symmetrical shape to precisely form the shape corresponding to the projections 2.

The pair of forming recesses 23 and 24 may be disposed between the first projection forming orifice 15 of the first extrusion die 11 and the second projection forming orifice 16 of the second extrusion die 12. Thus, when a material is transferred through the first projection forming orifice 15, the pair of rotors 21 and 22 may rotate to face each other and the pair of forming recesses 23 and 24 may first form the material to have a shape corresponding to the projection 2 of FIG. 1, and the first formed portion may be discharged through the second projection forming orifice 16, thus forming a product having the projection 2 provided on a lower portion of the body part 1 as illustrated in FIG. 8.

That is, the pair of forming recesses 23 and 24 may be parts for forming the projection 2, and the first projection forming orifice 15 may be a transfer path for transferring an introduced material to the forming recesses 23 and 24 and the second projection forming orifice 16 may be a finishing path finishing a shape of the projection 2 formed by the forming recesses 23 and 24 of the rotors 21 and 22 as described hereinafter.

In particular, as illustrated in FIG. 3, the first projection forming orifice 15 may have a cross-sectional area larger than that of the second projection forming orifice 16, and thus, the material may be more smoothly introduced to the first projection forming orifice 15 of the first extrusion die 11, whereby the projection 2 may be more precisely formed.

The second projection forming orifice 16 may have the same shape and the same size as those of the projection 2 of a product, and in particular, the second projection forming orifice 16 may have substantially the same shape and size as those of the pair of forming recesses 23 and 24 as illustrated in FIG. 3, so that a portion formed by the forming recesses 23 and 24 may be more precisely finished.

In the molding apparatus according to the present disclosure configured as described above, an extrusion forming process and a projection forming process performed in the process of introducing a material to the first extrusion die 11 and subsequently discharging the material through the second extrusion die 12 will be described in detail.

When a material is introduced to the first extruding orifice 13 and the first projection forming orifice 15 of the first extrusion die 11, the material may be extruded, while passing through the first extruding orifice 13 and the second extruding orifice 14, to form the body part 1 having a fixed cross-sectional profile in the length direction as illustrated in FIG. 8.

Also, the material transferred through the first projection forming orifice 15 may be formed as the projection 2 integrally formed in the body part 1 as illustrated in FIG. 8, by the forming recesses 23 and 24 of the rotors 21 and 22 and the second projection forming orifice 16.

A projection forming process for forming the projection 2 will be described in detail. When the pair of rotors 21 and 22 rotate in opposite directions such that the pair of forming recesses 23 and 24 face each other as illustrated in FIG. 7, a material may be transferred through the first projection forming orifice 15 and a portion thereof corresponding to the projection 2 of FIG. 1 may be first formed by the pair of forming recesses 23 and 24 facing each other. The first formed portion then may pass through the second projection forming orifice 16 of the second extrusion die 12 so as to be precisely finished in shape, and thereafter, a product in which the projection 2 may be integrally formed on the lower end of the body part 1 as illustrated in FIG. 8 may be discharged.

In a case where a plurality of projections 2 are intended to be formed in a lower end of the body part 1 at a predetermined interval, a rotating speed of the rotors 21 and 22 may be adjusted to appropriately adjust a space between the projections 2.

In the above descriptions, it is described that shapes and sizes of the first extruding orifice 13, the second extruding orifice 14, the first projection forming orifice 15, and the second projection forming orifice 16 may correspond to those of the product illustrated in FIG. 1, but a molding apparatus according to an exemplary embodiment of the present disclosure is not limited to a formation of the product shape of FIG. 1, and may form various other product shapes. Thus, the shapes and sizes of the first extruding orifice 13, the second extruding orifice 14, the first projection forming orifice 15, and the second projection forming orifice 16 may be variously modified according to shapes and sizes of a product intended to be formed.

As described above, according to an exemplary embodiment of the present disclosure, since one or more rotors having forming recesses for forming a projection may be configured to rotate in a middle portion of the extrusion die, extrusion forming and projection forming may be performed through a single process, whereby a product having an extrusion shape in which one or more projections may be integrally formed may be rapidly and precisely formed.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A molding apparatus comprising:
   an extrusion die having an extruding orifice and a projection forming orifice; and
   a rotor rotatably installed in a middle portion of the extrusion die and having a forming recess adjacent to the projection forming orifice,
   wherein the extruding orifice includes a first extruding orifice disposed at an upstream side of the forming recess and a second extruding orifice disposed at a downstream side of the forming recess, and
   wherein the projection forming orifice includes a first projection forming orifice disposed at the upstream side of the forming recess and a second projection forming orifice disposed at the downstream side of the forming recess.

2. The molding apparatus according to claim 1, wherein the extruding orifice has an extrusion shape, and the projection forming orifice forms a projection shape in cooperation with the forming recess.

3. The molding apparatus according to claim 1, wherein the first extruding orifice and the second extruding orifice have the same shape and the same size.

4. The molding apparatus according to claim 3, wherein the first projection forming orifice has a cross-sectional area larger than that of the second projection forming orifice.

5. The molding apparatus according to claim 4, wherein the extrusion die includes a first extrusion die positioned in a direction in which a material is introduced and a second extrusion die positioned in a direction in which the material is discharged.

6. The molding apparatus according to claim 5, wherein the first extruding orifice and the first projection forming orifice are in the first extrusion die, and the second extruding orifice and the second projection forming orifice are in the second extrusion die.

7. The molding apparatus according to claim 5, wherein the rotor is rotatably installed between the first extrusion die and the second extrusion die.

8. The molding apparatus according to claim 7, wherein an accommodation surface rotatably accommodating the rotor is provided in portions of the first extrusion die and the second extrusion die facing each other.

9. The molding apparatus according to claim 8, wherein the accommodation surface corresponds to an outer surface of the rotor.

10. A molding apparatus for forming an extrusion product having an extrusion shape and including one or more projections integrally formed thereon, the molding apparatus comprising:
    an extrusion die having an extruding orifice for the extrusion shape and a projection forming orifice for a projection shape; and
    a rotor rotatably installed in a middle portion of the extrusion die and having a forming recess for the projection shape in cooperation with the projection forming orifice,
    wherein the extrusion die includes:
       a first extrusion die positioned in a direction in which a material is introduced; and
       a second extrusion die positioned in a direction in which the material is discharged.

11. The molding apparatus according to claim 10, wherein the first extrusion die has a first extruding orifice and a first projection forming orifice, the second extrusion die has a second extruding orifice and a second projection forming orifice, the first extruding orifice and the second extruding orifice communicate with each other, and the first projection forming orifice and the second projection forming orifice communicate with each other.

12. The molding apparatus according to claim 11, wherein the rotor is rotatably installed between the first extrusion die and the second extrusion die.

13. The molding apparatus according to claim 12, wherein an accommodation surface rotatably accommodating the rotor is provided in portions of the first extrusion die and the second extrusion die facing each other.

* * * * *